Patented Aug. 22, 1944

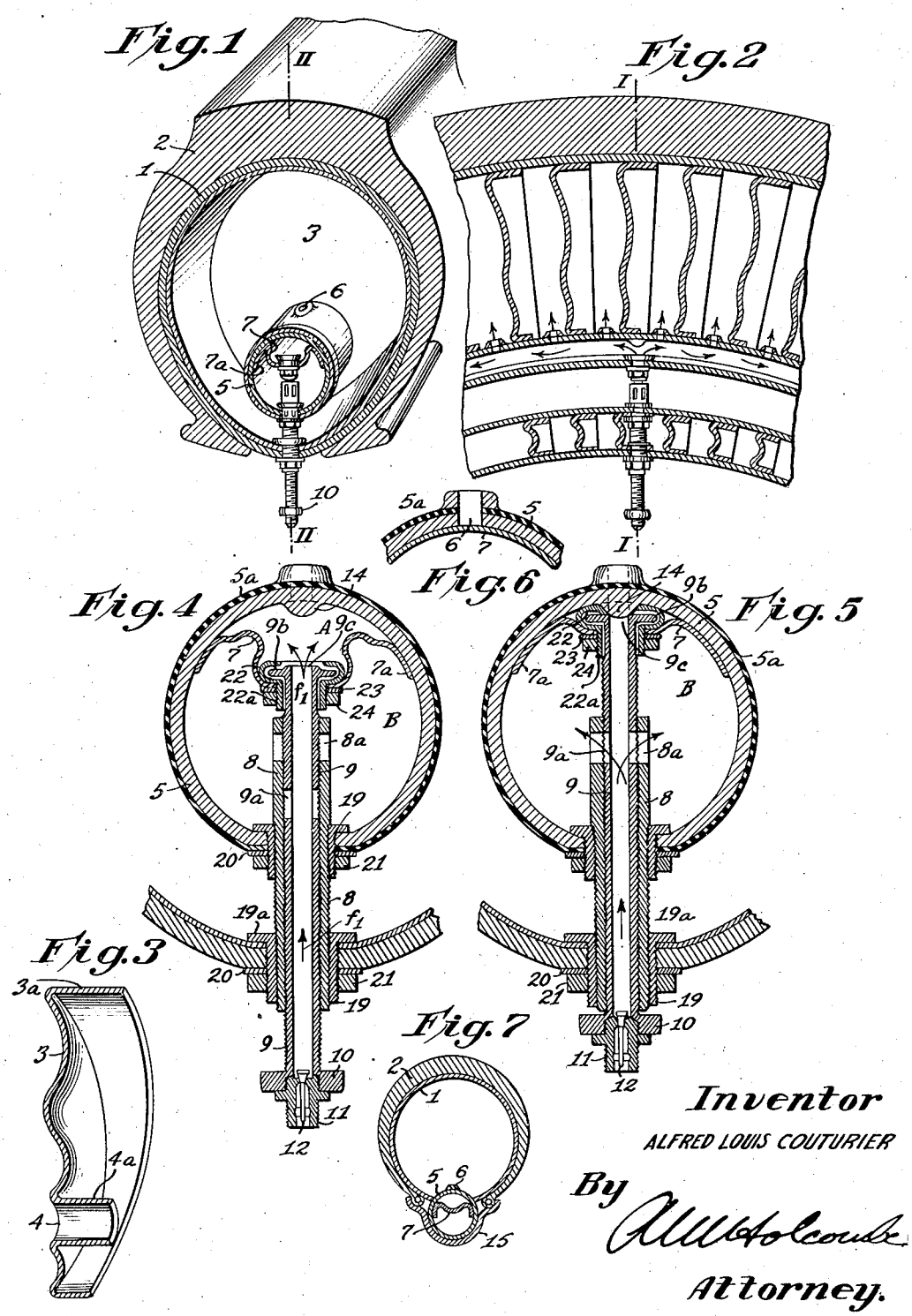

2,356,508

UNITED STATES PATENT OFFICE 2,356,508

AIR TUBE FOR PNEUMATIC TIRES

Alfred Louis Couturier, Orleans, France; vested in the Alien Property Custodian

Application May 5, 1942, Serial No. 441,860
In France December 9, 1941

4 Claims. (Cl. 152—338)

My invention relates to air tubes for pneumatic tires applicable to vehicles of any kind.

A primary object is to provide an air tube constructed to minimize deflation in case of puncture. According to my invention, the air tube is divided in a number of cells by air-tight flexible inner partitions and through the latter passes an air supply tube having an inflating valve, said tube being adapted to deliver air to the cells through apertures in its periphery. The air supply tube may be provided with a membrane arranged to be applied against its inner wall after inflation of the cells, and to close the apertures, so as to prevent any back flow of air through the inflating valve.

The following description with reference to the appended drawing given by way of non-limitative examples will show the manner in which my invention may be carried out in practice.

Fig. 1 is a transverse section through a pneumatic tire having an air tube in accordance with this invention, the section being taken along line I—I of Fig. 2.

Fig. 2 is a corresponding longitudinal section of a portion of the tire, the section being taken along line II—II of Fig. 1.

Fig. 3 is a central vertical section, with parts in perspective through a partition.

Figs. 4 and 5 are transverse sections of the air supply tube through the inflating valve, during inflation and at the end of inflation respectively.

Fig. 6 is a detail cross-section showing the parts of the air supply tube adjacent to an air supply aperture.

Fig. 7 shows a modified form of the embodiment illustrated by Fig. 1.

Referring to Figs. 1 to 6, the air tube 1 positioned in tire shoe 2 is divided circumferentially into compartments or cells 13 by transverse partitions 3 made of rubber or like flexible material; any suitable number of cells may be provided, for instance 80 in a conventional automobile air tube. Each partition 3 (Figs. 2 and 3) has a larger diameter than air tube 1 in order to have a substantial amount of play. The marginal portion of each partition is bent at 3a and is cemented and vulcanized to the inner surface of the air tube. As better shown on Figs. 2 and 3 the bent portion or flange 3a has a gradually increasing width from the bead side to the crown side of the tube, its outer end lying substantially in a radial plane with respect to the wheel.

In the vicinity of the bead contacting or lower portion of the air tube, each partition 3 has an aperture 4 with a wide collar 4a to accommodate an endless air supply tube 5 on which the collars 4a are cemented and vulcanised to ensure airtightness.

The air supply tube 5 is made of rubber with a strong canvas layer positioned around it, as shown at 5a, so as to remain sufficiently rigid and avoid any distortion; the tube 5 has apertures 6 with reinforced edges each of which opens in a cell 13 for air supply thereto. The tube 5 is divided into two annular chambers A, B by an endless band or membrane which is cemented along its edges at 7a (Figs. 1 and 4) and is wide enough to move in the tube and close the apertures therein as will be hereinafter explained.

The inflating valve for supplying air to the cells extends as far as and opens through said band or membrane 7; the valve comprises two concentric cylindrical parts 8, 9; part 9 is screwed into part 8 so that they may be moved lengthwise with respect to one another. The outer part 8 is secured to air tube 1 (Figs. 4 and 5) by means of a sleeve 19 provided with inner and outer screwthreads, which is screwed over part 8. The upper end of sleeve 19 has a flange 19a and the air tube 1 is nipped in known manner between flange 19a and a washer 20 by a tightening nut 21 screwed on the body portion of sleeve 19. The outer part 8 of the valve extends into air supply tube 5 to which it is secured in the same way as described with reference to air tube 1. The inner part 9 is secured through its upper end to the band or membrane 7 in the following manner:

The upper end of part 9 has a flange 9b which may freely turn in a groove in the inner periphery of the enlarged upper portion 22 of sleeve 22a which has an outer screw-thread to receive a lock washer 23 and a nut 24. The band or membrane 7 is nipped by nut 24 between members 22 and 23. Hence the inner part 9 of the valve may rotate to be screwed into outer part 8 or unscrewed for relative lengthwise movement, a nut or knurled thumb-piece 10 at its base facilitating the rotation of inner part 9. Parts 8 and 9 have ports 8a, 9a which are offset or staggered in vertical direction so that they may be brought to register by suitably moving part 9 in part 8. The outer end 11 of part 9 is arranged to accommodate the inflating pump connector and the air check valve 12 is housed therein. A resilient pad 14 is positioned on the inner surface of tube 5 opposite the end 9c of part 9.

The operation is as follows (Figs. 1, 2 and 4): when air is supplied to the valve from an inflating pump, it travels along a path indicated by arrow $f_1$, enters the upper annular chamber A in air supply tube 5 and is distributed past apertures 6 into the various cells 13 in the air tube 1. As soon as the air pressure within the air tube is deemed suitable, the knurled thumb-piece or nut 10 is turned to move up part 9 in part 8. At the end of its stroke, part 9 has its end 9c in abutting contact with pad 14, thereby preventing any back flow of air towards check valve 12; ports 8a and 9a are in registering relationship as shown on Fig. 5. As inflating is resumed, air from the pump is forwarded through ports 8a, 9a into lower annular chamber B in tube 5; inflation is continued until the pressure prevailing in chamber B is substantially higher than within the cells, in order that membrane 7 is securely applied against the inner wall of tube 5 and thus closes apertures 6 (Fig. 6). The inflating connector may thus be removed and the valve nose may be fitted with its cap, any back flow of air from the cells being prevented.

Assuming that any one of the cells happens to be punctured, the pressure in the other cells will elastically deform the partitions of the emptied cell, the average inner pressure of the air tube will be lowered by a negligible amount and the tire will generally behave as though no deflation took place.

The operation for deflating the air tube is as follows: check valve 12 is held open (or removed) whereby chamber B is set in communication with the atmosphere, ports 8a and 9a being in registering relationship. The nut 10 is turned to move down valve part 9, whereupon chamber A and thus all cells are in communication with atmosphere through the valve inner hole.

Instead of being housed within the air tube, the air supply tube 5 may be partly located without air tube 1, as shown on Fig. 7. In such instance, the air supply tube 5 is partly encased in a well base rim 15. The latter arrangement which results in a lighter weight is particularly valuable for bicycles and motorcycles.

It will be apparent that the foregoing embodiments of my invention may be altered without departing from the spirit of said invention as comprehended with the appended claims; for instance, I may divide the cells into two or three compartments which would amount to supplementary cells.

What I claim is:

1. In combination with an air tube divided into cells, an air supply tube located at least partly in the air tube, a flexible partition in said air supply tube adapted and arranged to divide it into two separate chambers, the air supply tube having apertures located on one side of the partition to place one chamber in communication with each cell, said partition being responsive to excess pressure in the other chamber over the pressure in the first-named chamber for closing said apertures; and a single valve for conveying inflating air to the air tube, adapted selectively to supply inflating air to either of said chambers, including a radially movable inner member secured to said flexible partition.

2. An air supply and air retaining device for cellular air tubes, which comprises an endless tube having air distributing apertures along a peripheral circle of the endless tube; an inner flexible, air-tight flap extending in endless formation within the endless tube, having its edges secured to the inner wall of the endless tube along two peripheral circles on either side of the first-named peripheral circle so as to divide the endless tube into two separate chambers, the flap being of such width as to be capable of bulging to seal the apertures when the pressure in the non-apertured chamber is higher than the pressure in the apertured chamber; and a valve for supplying air to one chamber and adjustable to a second position for supplying air to the other chamber, including an apertured inner member secured to and radially movable with said flap.

3. In combination with the air tube divided into cells, an air supply tube located at least partly in the air tube; a partition in said air supply tube adapted and arranged to divide it into two separate chambers, the air supply tube having apertures located on one side of the partition to place one chamber in communication with each cell; pneumatically operated means responsive to excess pressure in the other chamber over the pressure in the first-named chamber for closing said apertures; and valved means for conveying inflating air to the first-named chamber, said means including manually operable means for diverting the inflating air flow from the first-named to the second-named chamber, comprising an outer valve stem fixed to both of said tubes and having an apertured end portion projecting into the air supply tube and an inner valve stem radially adjustable within the outer stem and secured at one end to said partition, the inner stem being provided with apertures spaced from said partition in position to register with the apertures in the outer stem upon sufficient radial adjustment of the inner stem.

4. In an apertured air supply tube of the type described, the combination with said tube of an inner air-tight partition extending between spaced apart points of the inner wall of said tube to divide it into two chambers, the tube and the partition having corresponding apertures; a pad on the inner wall of the tube positioned in alignment with said apertures; a first tubular valve part passing with air-tight fit through the aperture in the tube; a second tubular valve part positioned in the first valve part, slidably movable therein, passing with air-tight fit through the aperture in the partition, having an open end facing the pad, the valve parts having corresponding ports in the zone intermediate the apertures, said ports being relatively located so as to register when the second valve part has been moved in the first valve part to have its open end in abutting relationship with the pad.

ALFRED LOUIS COUTURIER.